(12) United States Patent
Feng et al.

(10) Patent No.: US 10,089,044 B2
(45) Date of Patent: *Oct. 2, 2018

(54) METHOD AND SYSTEM FOR MANAGING SOFTWARE VERSION COMPATIBILITY AMONGST DEVICES IN A MULTI-DEVICE NETWORK ENVIRONMENT

(71) Applicant: KONICA MINOLTA LABORATORY U.S.A., INC., San Mateo, CA (US)

(72) Inventors: Ann Qiongying Feng, San Jose, CA (US); Kenneth Huang Young, Foster City, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/659,303

(22) Filed: Jul. 25, 2017

(65) Prior Publication Data

US 2017/0322753 A1    Nov. 9, 2017

Related U.S. Application Data

(63) Continuation of application No. 14/671,408, filed on Mar. 27, 2015, now Pat. No. 9,760,316.

(51) Int. Cl.
*G06F 3/12* (2006.01)
*H04N 1/00* (2006.01)

(52) U.S. Cl.
CPC ............ *G06F 3/1204* (2013.01); *G06F 3/123* (2013.01); *G06F 3/1285* (2013.01); *H04N 1/00127* (2013.01)

(58) Field of Classification Search
None
See application file for complete search history.

(56) References Cited

U.S. PATENT DOCUMENTS 5,579,509 A * 11/1996 Furtney ............... G06F 8/71
703/27
5,580,177 A * 12/1996 Gase ............... G06F 3/1204
358/1.15

(Continued)

FOREIGN PATENT DOCUMENTS

JP    H06-180643 A    6/1994

*Primary Examiner* — Ted Barnes
(74) *Attorney, Agent, or Firm* — Buchanan Ingersoll & Rooney PC

(57) ABSTRACT

A method, a readable recording medium, and a system are disclosed for managing software version compatibility amongst a plurality of devices within a network. The method includes hosting a configuration file on a server, populating the configuration file for each of the two or more printers within the network with a printer identifier and one or more software versions associated with each of the two or more printers; executing a configuration tool on the server to compare the one or more software versions on a first printer of the two or more printers and the one or more software versions on at least one second printer of the two or more printers; and displaying if there is a software version discrepancy between the one or more software versions on the first printer and the one or more software versions on the at least one second printer.

20 Claims, 3 Drawing Sheets

(56) References Cited

U.S. PATENT DOCUMENTS

| | | | | |
|---|---|---|---|---|
| 5,634,114 A * | 5/1997 | Shipley | G06F 8/71 | 717/170 |
| 6,415,435 B1 * | 7/2002 | McIntyre | G06F 8/76 | 717/108 |
| 6,581,157 B1 * | 6/2003 | Chiles | G06F 8/65 | 713/1 |
| 6,606,162 B1 * | 8/2003 | Simpson | G06F 3/1204 | 358/1.15 |
| 6,658,659 B2 * | 12/2003 | Hiller | G06F 9/44536 | 707/999.202 |
| 6,754,717 B1 * | 6/2004 | Day, III | G06F 9/546 | 709/203 |
| 6,757,071 B1 * | 6/2004 | Goodman | H04L 29/06 | 358/1.13 |
| 6,814,510 B1 * | 11/2004 | Sabbagh | G06F 3/1204 | 400/61 |
| 6,871,344 B2 * | 3/2005 | Grier | G06F 8/54 | 717/162 |
| 6,975,417 B1 * | 12/2005 | Hilpl | G03G 15/50 | 358/1.13 |
| 7,065,560 B2 * | 6/2006 | Erickson | G06F 8/71 | 709/219 |
| 7,146,611 B1 * | 12/2006 | Phillips | G06F 9/44594 | 717/174 |
| 7,168,003 B2 * | 1/2007 | Lozano | G06F 9/4411 | 702/108 |
| 7,191,439 B2 * | 3/2007 | Donaldson | G06F 9/45537 | 717/121 |
| 7,210,143 B2 * | 4/2007 | Or | G06F 8/61 | 717/174 |
| 7,237,238 B2 * | 6/2007 | Peppers | G06F 8/60 | 717/170 |
| 7,376,951 B1 * | 5/2008 | Yip | G06F 8/71 | 718/100 |
| 7,383,541 B1 * | 6/2008 | Banks | G06F 8/65 | 717/126 |
| 7,689,983 B2 * | 3/2010 | Kitayama | G06F 9/44536 | 717/122 |
| 7,752,617 B2 * | 7/2010 | Blinick | G06F 8/65 | 717/120 |
| 7,788,662 B2 * | 8/2010 | Haselden | G06F 8/65 | 717/116 |
| 7,865,891 B2 * | 1/2011 | Saito | G06F 9/44536 | 358/1.15 |
| 7,873,958 B2 * | 1/2011 | Wiltamuth | G06F 8/71 | 717/170 |
| 7,899,558 B2 * | 3/2011 | Kuhls | G06F 8/65 | 700/11 |
| 8,001,523 B1 * | 8/2011 | Wiltamuth | G06F 8/36 | 717/108 |
| 8,260,467 B2 * | 9/2012 | Altemark | F03D 7/047 | 700/286 |
| 8,368,915 B1 * | 2/2013 | Feeser | G06F 3/1296 | 347/19 |
| 8,522,227 B2 * | 8/2013 | Santos | G06F 9/44536 | 717/162 |
| 8,713,550 B2 * | 4/2014 | Bhat | G06F 8/71 | 717/107 |
| 8,935,734 B2 * | 1/2015 | Govande | H04L 67/2823 | 725/82 |
| 9,213,508 B2 * | 12/2015 | Sueshige | G06F 3/1244 | |
| 2001/0044935 A1 * | 11/2001 | Kitayama | G06F 9/44536 | 717/170 |
| 2002/0065807 A1 * | 5/2002 | Kawamoto | G06F 3/1205 | |
| 2002/0067504 A1 * | 6/2002 | Salgado | G06F 9/4411 | 358/1.15 |
| 2002/0154324 A1 * | 10/2002 | Tay | G06F 3/1204 | 358/1.9 |
| 2002/0199180 A1 * | 12/2002 | Donaldson | G06F 9/45537 | 717/178 |
| 2003/0053129 A1 * | 3/2003 | Morooka | G06F 3/1205 | 358/1.15 |
| 2003/0112456 A1 * | 6/2003 | Tomita | G06F 3/1204 | 358/1.13 |
| 2003/0123082 A1 * | 7/2003 | Hall | G06F 3/1204 | 358/1.15 |
| 2003/0133146 A1 * | 7/2003 | Parry | G06F 3/1204 | 358/1.15 |
| 2003/0135668 A1 * | 7/2003 | Abe | G06F 9/4411 | 710/15 |
| 2003/0159135 A1 * | 8/2003 | Hiller | G06F 9/44536 | 717/166 |
| 2004/0017585 A1 * | 1/2004 | Makishima | G06F 21/608 | 358/1.18 |
| 2004/0030809 A1 * | 2/2004 | Lozano | G06F 9/4411 | 710/8 |
| 2004/0136023 A1 * | 7/2004 | Sato | G06F 3/1205 | 358/1.13 |
| 2004/0207868 A1 * | 10/2004 | Lay | G06F 17/30067 | 358/1.15 |
| 2004/0216144 A1 * | 10/2004 | Mitsui | G06F 3/1205 | 719/321 |
| 2004/0257604 A1 * | 12/2004 | Morooka | G06F 3/1204 | 358/1.14 |
| 2005/0117180 A1 * | 6/2005 | Kato | G06F 3/1208 | 358/1.15 |
| 2005/0190392 A1 * | 9/2005 | Carroll | G06K 15/007 | 358/1.13 |
| 2005/0225795 A1 * | 10/2005 | Nuggehalli | G06F 3/1205 | 358/1.15 |
| 2006/0103867 A1 * | 5/2006 | Kato | G06F 3/1206 | 358/1.13 |
| 2006/0103868 A1 * | 5/2006 | Mitsui | G06F 3/121 | 358/1.13 |
| 2006/0103869 A1 * | 5/2006 | Kato | G06F 3/1204 | 358/1.13 |
| 2006/0184926 A1 * | 8/2006 | Or | G06F 8/61 | 717/168 |
| 2006/0238777 A1 * | 10/2006 | Anno | H04N 1/00127 | 358/1.1 |
| 2006/0285151 A1 * | 12/2006 | Kurita | G06K 15/00 | 358/1.15 |
| 2007/0006217 A1 * | 1/2007 | Tammana | G06F 8/61 | 717/174 |
| 2007/0146733 A1 * | 6/2007 | Kennis | G06F 3/1204 | 358/1.1 |
| 2009/0009792 A1 * | 1/2009 | Zimmerman | G06F 3/1211 | 358/1.15 |
| 2009/0024992 A1 * | 1/2009 | Kulaga | G06F 9/44505 | 717/177 |
| 2009/0051963 A1 * | 2/2009 | Igarashi | H04N 1/00344 | 358/1.15 |
| 2009/0109461 A1 * | 4/2009 | Moreno | H04N 1/00 | 358/1.13 |
| 2009/0180140 A1 * | 7/2009 | Kawamura | G06F 3/1255 | 358/1.15 |
| 2009/0210866 A1 * | 8/2009 | Troan | G06F 8/65 | 717/168 |
| 2010/0149578 A1 * | 6/2010 | Zimmerman | G06F 3/122 | 358/1.13 |
| 2010/0251232 A1 * | 9/2010 | Shinomiya | G06F 8/60 | 717/177 |
| 2011/0047536 A1 * | 2/2011 | Santos | G06F 8/71 | 717/170 |
| 2011/0060895 A1 * | 3/2011 | Solomon | G06F 8/36 | 713/1 |
| 2011/0231542 A1 * | 9/2011 | Komano | H04N 1/00344 | 709/224 |
| 2011/0231586 A1 * | 9/2011 | Komano | G06F 3/1203 | 710/18 |
| 2012/0224207 A1 * | 9/2012 | Sueshige | G06F 3/1205 | 358/1.13 |
| 2013/0094044 A1 * | 4/2013 | Harada | G06F 3/1205 | 358/1.13 |
| 2013/0235402 A1 * | 9/2013 | Yamamichi | G06F 3/1204 | 358/1.13 |
| 2014/0055799 A1 * | 2/2014 | Nakagawa | G06K 15/1803 | 358/1.13 |

(56) References Cited

U.S. PATENT DOCUMENTS

| | | | |
|---|---|---|---|
| 2014/0208320 A1* | 7/2014 | Huang | G06F 8/63 |
| | | | 718/1 |
| 2014/0282469 A1* | 9/2014 | Johnson | G06F 8/65 |
| | | | 717/170 |
| 2014/0376031 A1* | 12/2014 | Takamoto | G06F 3/1225 |
| | | | 358/1.14 |
| 2016/0283174 A1 | 9/2016 | Feng et al. | |

* cited by examiner

METHOD AND SYSTEM FOR MANAGING SOFTWARE VERSION COMPATIBILITY AMONGST DEVICES IN A MULTI-DEVICE NETWORK ENVIRONMENT

CROSS-REFERENCES TO RELATED APPLICATIONS

This application is a continuation of U.S. application Ser. No. 14/671,408 filed on Mar. 27, 2015, the entire content of which is incorporated herein by reference.

FIELD OF THE INVENTION

The present invention relates to a method and system for managing software version compatibility amongst devices in a multi-device network environment, and more particularly to a method and system for managing software version compatibility used in a multi-device network of color printers, multi-function peripherals (MFP) and/or image forming apparatuses.

BACKGROUND OF THE INVENTION

Often, a project can required managing multiple versions of software, for example, engine firmware on printers and image forming apparatuses. Each version can have some functional differences between them. For example, generally, an administration or user will need to test each version in conjunction with, for example, a single version of a digital front end controller (DFE). In addition, the digital front end controller (DFE) has to have the ability to work with those multiple engine firmware versions.

However, if the wrong version is installed and connected to, for example, a DFE, it would be desirable to have method and system of managing the software since it could be difficult to manage a plurality of versions of software/firmware inside each of the devices (print engine, DFE). In addition, it would be desirable to have a software configuration tool that can manage different software versions each of the devices inside a network environment.

In a multi-device environment, many devices can be interconnected to each other through the network. Due to this interconnectivity, the software versions of each of the devices must be compatible with each other. For example, to print a job, you will need a printer driver installed in a user's PC, but you will also need the firmware running inside the print engine that must be compatible to the printer driver. If, for example, the printer driver version is new, and some of the new features that the print engine firmware cannot support, the printer may display an "unsupported feature" message.

Currently, to ensure the proper version of software, a system administrator has to manually check each version (in the case of, for example, a printer, the administrator must print out the configuration page) against each other to ensure they are all compatible. In some cases, even if they are compatible, they may not be the latest version available on the system. In other cases, the user or system administrator intentionally does not want to put the latest version perhaps because it is less stable than an older version. In accordance with an exemplary embodiment, a method and system are disclosed for managing the installed software on the network to ensure, for example, compatibility among the latest version of the software within one or more devices, including compatibility, wherein more than one configuration may exist.

SUMMARY OF THE INVENTION

In consideration of the above issues, it would be desirable to have a method and system for managing software version compatibility amongst devices in a multi-device network environment.

In accordance with an exemplary embodiment, a method is disclosed for managing software version compatibility amongst a plurality of devices within a network, the method comprising: hosting a configuration file on a server, the configuration file including an identifier for one or more devices within the network; populating the configuration file for each of the one or more devices within the network with a device identifier and one or more software modules associated with each of the one or more devices within the network, the at least one software module configured to perform one or more specific operations on a device; executing a configuration tool on the server to compare the one or more software modules in each of the one or more devices within the network to check for conflicts between two or more software modules on the one or more devices; and replacing at least one of the two or more software modules on the one or more devices, if a conflict exists between the two or more software modules.

In accordance with a further exemplary embodiment, a non-transitory computer readable recording medium stored with a computer readable program code for managing software version compatibility amongst a plurality of devices within a network is disclosed, the computer readable program code configured to execute a process comprising: hosting a configuration file on a server, the configuration file including an identifier for one or more devices within the network; populating the configuration file for each of the one or more devices within the network with a device identifier and one or more software modules associated with each of the one or more devices within the network, the at least one software module configured to perform one or more specific operations on a device; executing a configuration tool on the server to compare the one or more software modules in each of the one or more devices within the network to check for conflicts between two or more software modules on the one or more devices; and replacing at least one of the two or more software modules on the one or more devices, if a conflict exists between the two or more software modules.

In accordance with another exemplary embodiment, a system is disclosed for managing software version compatibility amongst a plurality of devices within a network, comprising: a server including: a configuration file, the configuration file including an identifier for one or more devices within the network; a configuration manager configured to populate the configuration file for each of the one or more devices within the network with a device identifier and one or more software modules associated with each of the one or more devices within the network with a configuration manager having a user interface, the at least one software module configured to perform one or more specific operations on a device; a configuration tool configured to compare the one or more software modules in each of the one or more devices within the network to check for conflicts between two or more software modules on the one or more devices, and replace at least one of the two or more software modules on the one or more devices, if a conflict exists between the two or more software modules; and a software database, the software database configured to store the one or more software modules associated with each of the one or more devices within the network.

In accordance with an exemplary embodiment, a method is disclosed for managing software version compatibility amongst a plurality of devices within a network, the method comprising: hosting a configuration file on a server, the configuration file including an identifier for two or more printers within the network; populating the configuration file for each of the two or more printers within the network with a printer identifier and one or more software versions associated with each of the two or more printers within the network; executing a configuration tool on the server to compare the one or more software versions on a first printer of the two or more printers and the one or more software versions on at least one second printer of the two or more printers; and displaying if there is a software version discrepancy between the one or more software versions on the first printer of the two or more printers and the one or more software versions on the at least one second printer of the two or more printers.

In accordance with an exemplary embodiment, a non-transitory computer readable recording medium stored with a computer readable program code for managing software version compatibility amongst a plurality of printers within a network is disclosed, the computer readable program code configured to execute a process comprising: hosting a configuration file on a server, the configuration file including an identifier for two or more printers within the network; populating the configuration file for each of the two or more printers within the network with a printer identifier and one or more software versions associated with each of the two or more printers within the network; executing a configuration tool on the server to compare the one or more software versions on a first printer of the two or more printers and the one or more software versions on at least one second printer of the two or more printers; and displaying if there is a software version discrepancy between the one or more software versions on the first printer of the two or more printers and the one or more software versions on the at least one second printer of the two or more printers.

In accordance with an exemplary embodiment, a server is disclosed for managing software version compatibility amongst two or more printers within a network, comprising: a configuration file, the configuration file including an identifier for each of the two or more printers within the network; a configuration manager configured to populate the configuration file for each of the two or more printers within the network with a printer identifier and one or more software versions associated with each of the two or more printers within the network; a configuration tool configured to compare the one or more software versions on a first printer of the two or more printers and the one or more software versions on at least one second printer of the two or more printers; and a display configured to display if there is a software version discrepancy between the one or more software versions on the first printer of the two or more printers and the one or more software versions on the at least one second printer of the two or more printers.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
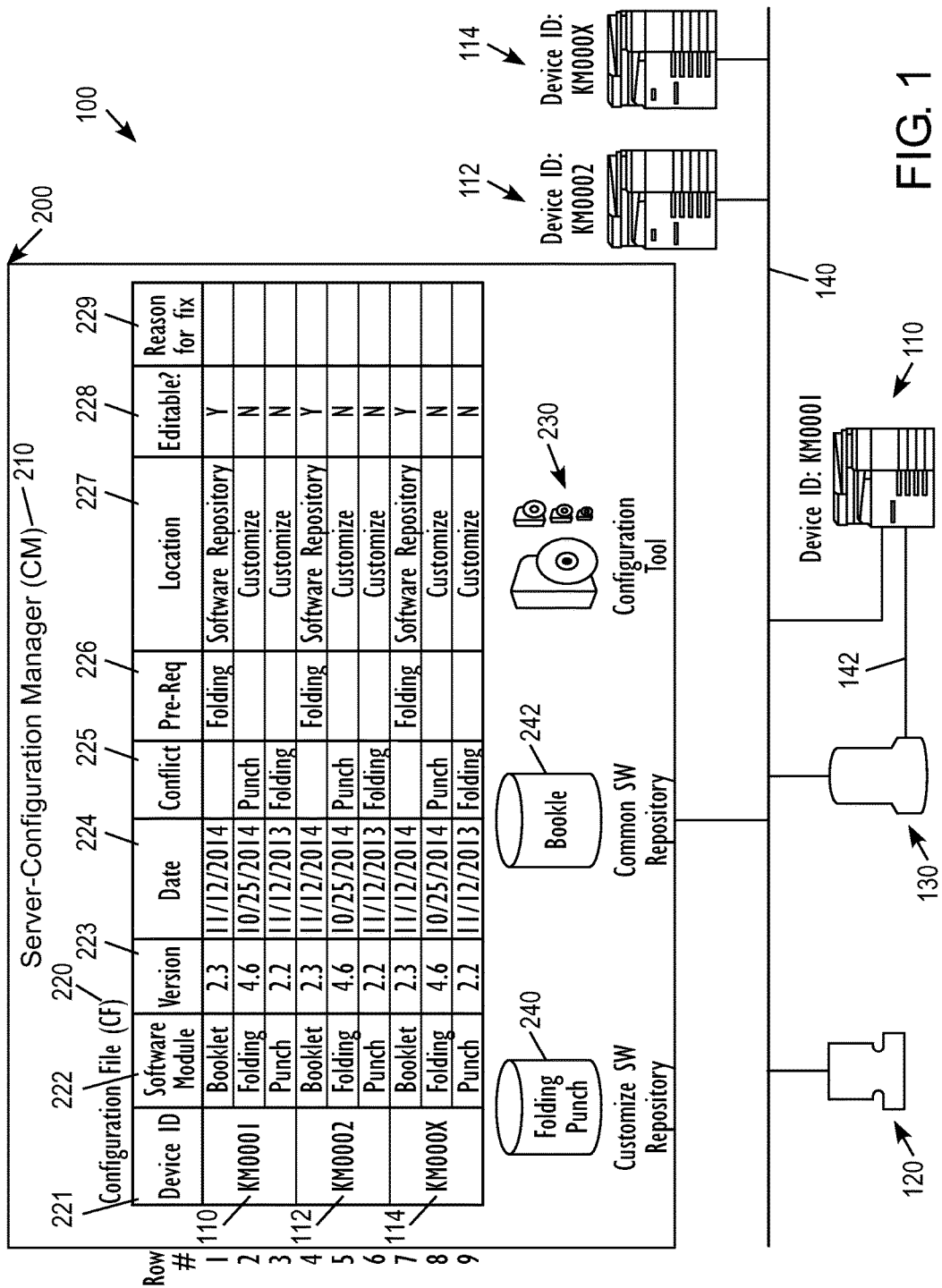
FIG. 1 is a diagram of an exemplary system in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, a method and system is disclosed that can help ensure that the correct version of the software is installed to allow all devices to be compatible to each other. In accordance with an exemplary embodiment, for example, when a problem occurs on one device but not the other (for example, a print job prints on one printer, but the print job does not print on another printer that is the same printer model), then the configuration tool will check if reason for the difference in printing result is caused by differences in software versions. If there are differences, it will display the differences, for example, a configuration file field "Reason for fix" in a configuration file table.

In addition, the method and system as disclosed herein, can allow an administrator to relatively easily customize different software versions on different devices (for the case where there are some special patches that will make the device function or work differently from other devices) by allowing the system administrator to explicitly indicate via the configuration file table which software version to use. The method and system can also recognize that some software (or software applications) can have dependencies, for example, the software needs to be installed in a certain sequence, and if not installed in the correct sequence, the software will not work. In addition, all of the above functionality can be done in an automated way instead of manually checking for software on each of the devices one by one.

In accordance with an exemplary embodiment, the methods described herein can be implemented in a system 100 that can include a plurality of multi-function devices 110, 112, 114, preferably in the form of a multi-function peripheral (MFP) or printer, one or more host devices 120, and a digital front end device 130, and a configuration manager server 200. For example, in accordance with an exemplary embodiment, each of the plurality of multi-function devices 110, 112, 114 preferably in the form of multi-function peripherals (or printers) can include a printer controller (or firmware), an image processing section (or data dispatcher), a print engine, an input/output (I/O) section, and a scanner. For example, the printer controller can include a central processing unit (CPU), a random access memory (RAM), and a read only memory (ROM).

Examples of multi-function device 110, 112, 114, consistent with exemplary embodiments of the invention include, but are not limited to, a multi-function peripheral (MFP), a laser beam printer (LBP), an LED printer, a multi-function laser beam printer including copy function, or color printer.

In accordance with another embodiment, the multi-function devices 110, 112, 114 can be configured as a multi-function peripheral (MFP) device or all-in-one (AIO) that includes a printer section for converting print data inputted from outside to image data and forming and printing out the converted image onto a printable media, a scanner section for optically reading a document (for example, an image recognition system), and a facsimile section for facsimile receiving and transmitting image data to and from external apparatuses through public telecommunication lines.

In addition, the plurality of multi-function devices 110, 112, 114 can include one or more post-processing apparatus or functions, which can include for example, a booklet module, a folding module, a punch module, a stitching or stapling module, and a stacking module. For example, a booklet, such a magazine, can be completed by folding the sheet bundle along the positions at which the stapling has been performed.

For example, in accordance with an exemplary embodiment, the image processing section within the plurality of multi-function devices 110, 112, 114 can be configured to carry out image processing under the control of the printer controller, and sends the processed print image data to the print engine. The image processing section also includes a scanner section for optically reading a document, such as an image recognition system. The scanner section receives the image from the scanner and converts the image into a digital image. The print engine forms an image on a recording sheet based on the image data sent from the image processing section. The I/O section performs data transfer with the host device 120. The controller can be programmed to process data and control various other components of the multi-function peripheral to carry out the various methods described herein. The print engine forms an image on a sheet of print medium (for example, a recording sheet) based on the image data sent from the image processing section.

The input/output (I/O) port provides communications between the printer section and the one or more host devices 120 and receives page descriptions (or print data) from the host for processing within the multi-function devices 110, 112, 114. In accordance with an exemplary embodiment, the operation of printer section commences when it receives a page description from the one or more host devices 120 via I/O port in the form of a print job data stream and/or fax data stream. The page description may be any kind of page description languages (PDLs), such as PostScript® (PS), Printer Control Language (PCL), Portable Document Format (PDF), and/or XML Paper Specification (XPS). The multi-function peripheral 110 can also include an auto feeding mechanism or tray, wherein a user can feed one or more sheets or pages of a printed image, cover sheet of a package of print media and/or other documents to the image processing section for imaging and processing.

In accordance with an exemplary embodiment, the one or more host devices 120 can include a processor, and one or more memories for storing software programs and data (such as files to be printed). In accordance with an exemplary embodiment, the one or more host devices 120 can include a multi-function peripheral, an image forming apparatus, a personal computer, a portable device such as a notebook personal computer, desktop computer, a mainframe, a kiosk, a cable box, a mobile, cellular or smart phone, a personal digital assistant (PDA), a router, an intermediary device and/or server and like devices and/or systems, which send data over a communication network 140.

In accordance with an exemplary embodiment, the system 100 can also include a digital front end (DFE) device 130. The digital front end device 130 can be configured to control the one or more multi-function printers and printers within the system 100. For example, the digital front end device 130 can be configured to load files from various network sources and process the files so they can be output on digital equipment, whether it be a small all-in-one or a large multi-functional peripheral or printer. In accordance with an exemplary embodiment, the digital front end device 130 can be configured to accept and process files for variable data applications and to pull information from a database for personalized documents. In addition, the DFE 130 can be networked to the plurality of multi-functions devices 100 via the network connection 140, or can be connected to one or more of the multi-function devices 110, 112, 114 via a video connection 142.

In accordance with an exemplary embodiment, the server 200 can include a configuration manager (CM) 210, a configuration file (CF) 220, a configuration tool (CT) 230, a customized software repository database 240, and a common software repository database 242. The server 200 preferably includes an operating system (OS), which acts as an intermediary between the software programs and hardware components within the configuration manager (CM) 210, the configuration file (CF) 220, the configuration tool (CT) 230, the customized software repository database 240, and the common software repository database 242. The operating system (OS) manages the computer hardware and provides common services for efficient execution of various software applications.

In accordance with an exemplary embodiment, the plurality of multi-function devices 110, 112, 114, the one or more host devices 120, the digital front end device 130, and the server 200 can be connected to one another via communication network 140. For example, the communication network 140 can be a public telecommunication line and/or a network (e.g., LAN or WAN) 140. Examples of the communication network 140 can include any telecommunication line and/or network consistent with embodiments of the disclosure including, but are not limited to, telecommunication or telephone lines, the Internet, an intranet, a local area network (LAN), a wide area network (WAN) and/or a wireless connection using radio frequency (RF) and/or infrared (IR) transmission.

In accordance with an exemplary embodiment, the configuration manager 210 of the server 200 can be a user interface based (UI-based) software that manages the workflow operation of the system 100. Through the configuration manager 210, a system administrator can create, edit, and maintain the configuration file 220. The configuration manager 210 can also be configured to run the configuration tool 230. In accordance with an exemplary embodiment, the configuration file 220 can be an editable file, which can define the correct versions of software that should be installed in each of the multi-function devices 110, 112, 114, within the system 100. For example, the configuration file 220 can be edited by the system administrator or a user. For example, in accordance with an exemplary, if the configuration file is editable by a user, only certain rows in the configuration file may be editable by the user. In accordance with an exemplary embodiment, the configuration tool 230 can be software that is configured to process all of the work to help ensure that the version installed in each of the multi-function devices 110, 112, 114 matches those that are specified in the configuration file 220.

In accordance with an exemplary embodiment, the configuration tool 230 can include a diagnostic mode that can compare software versions installed in each of the multi-function devices 110, 112, 114 and determine the possible causes of difference in behavior due to the different version of software installed on the same model. In accordance with an exemplary embodiment, the configuration file 220 can include, for example, a table, which includes the following fields:

(1) "Device identifier" (or ID) 221: Each device 110, 112, 114 in the system 100 (or network) preferably contains a Device ID that differentiates each device in the network. For example, in accordance with an exemplary embodiment, the device ID 221 can be a MAC address, a unique identifier, or for example, a device serial number;

(2) "Software Module" 222: This indicates what type of software module is associated with the Device ID, for example, for a multi-function peripheral or printer, it could be a booklet, folding, punch, etc.;

(3) "Version" 223: This indicates the version of the software that should be configured and installed in the Device ID;

(4) "Date" 224: This is the date of the software version;

(5) "Conflict" 225: This field can indicate if two software modules can co-exist with each other. For example, in FIG. 1, for purposes of example only, the Folding Device Type and the Punch Device Type cannot co-exist. In actuality, this situation may happen if the Folding Device and Punch Device are features that are contradicting each other, for example, each is like a toggle, which can have either a "Folding" module or a "Punch" module. For example, the conflict can relate to special, customized software patches, which often do not work well with other software modules;

(6) "Pre-Requisite" 226: This field can indicate whether the software has to be pre-installed with another software module first. In the provided example, the Booklet Maker cannot be installed until the Folding device has been installed first;

(7) "Location" 227: This field can indicate the location where it can retrieve the software. In accordance with an exemplary embodiment, there can be two types of repositories (or software databases); the first one is used for common software modules. The second one is for the customized solution that requires a fee to be able to access that repository;

(8) "Editable" 228: The configuration file 220 can be preferably created and eventually maintained by the system administrator. However, in some situations, a non-system administrator may edit the configuration file 220. In this situation, only a certain software module may be editable; and (9) "Reason for fix" 229: For example, it can be possible that a new release of the software is to fix a particular software issue. When this happens, this field will contain the reason for the software fix. In addition, for example, if a print job prints on one device and does not print on a similar or the same device, in the "Reason for fix" column, the differences can be displayed.

In accordance with an exemplary embodiment, the configuration tool (CT) 230 can be a piece of software running inside the server 200. The configuration tool (CT) function can be to read the configuration file (CF) 220 and based on information found in the configuration file (CF) 220, be configured to install the required software module to each of the devices 110, 112, 114 in the network or system 100.

In accordance with an exemplary embodiment, the server 200 can also include a configuration manager (CM) 210, which a user interface based (UI-based) system that allows the editing of the configuration file (CF) 220 and the running or executing of the configuration tool (CT) 230.

In accordance with an exemplary embodiment, the server 200 can include a customize software repository database (DB) 240. The customize software repository database 240 can be a database that contains the customized software for one or more of the plurality of devices 110, 112, 114. In accordance with an exemplary embodiment, the software is the customize software repository database 240 can be a paid software since the software has been customized to perform a specific function. In accordance with an exemplary embodiment, the server 200 can also include a common software repository database (DB) 242, which can be a database that contains the common software, for example, software, which can be bundled in one or more of the devices 110, 112, 114.

Figure 2:
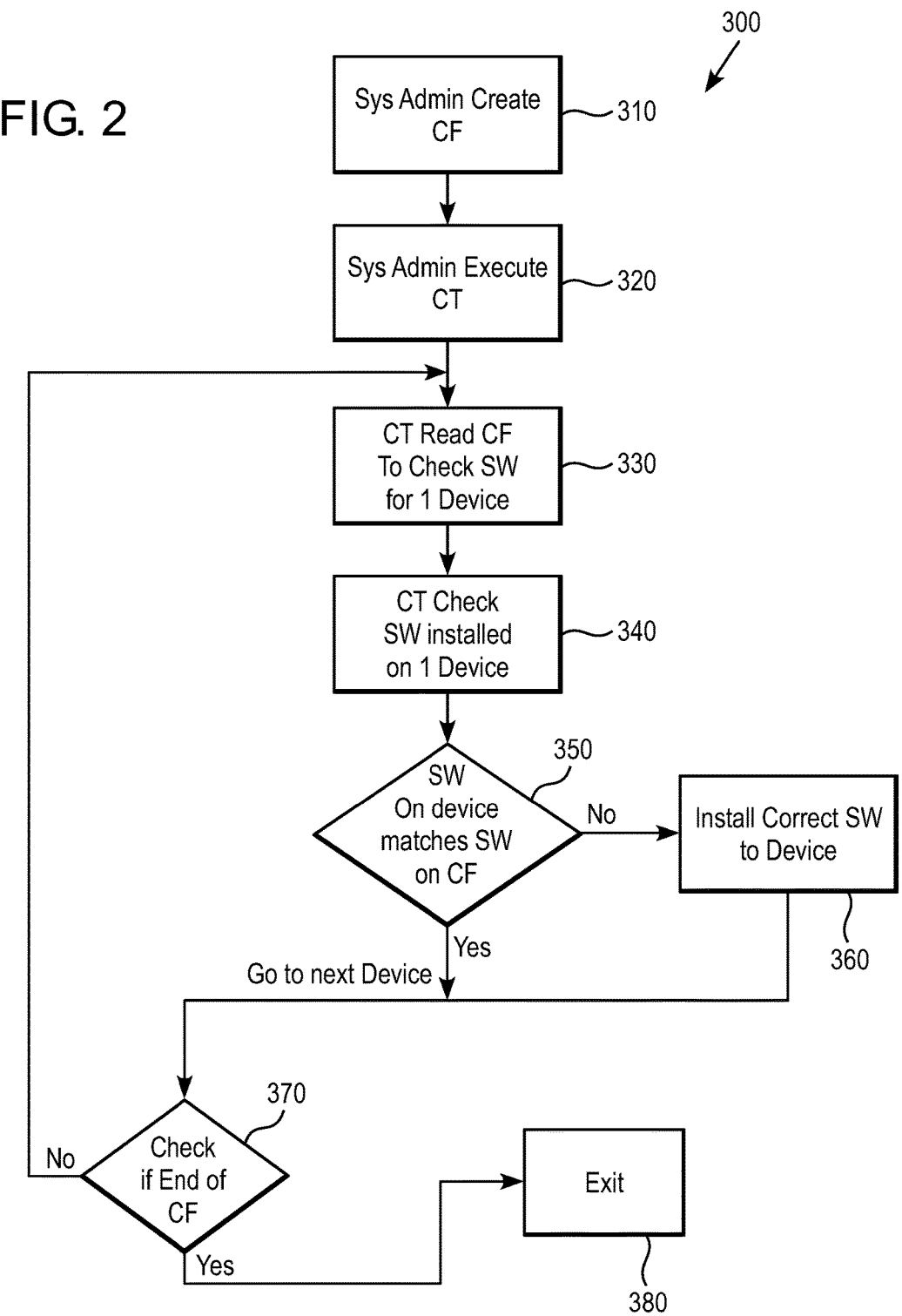
FIG. 2 is a flow chart illustrating a workflow for managing software version compatibility in accordance with an exemplary embodiment.

FIG. 2 is a flow chart illustrating a process 300 for managing software version compatibility in accordance with an exemplary embodiment. As shown in FIG. 2, the configuration manager (CM) 210 can be a user interface based software application that can allow a system administrator in step 310 to create and edit the configuration file (CF) 220. The system administrator can populate the fields in the configuration file (CF) 220 with information the system administrator knows about the software modules running in each device 110, 112, 114, and compatibility of the software modules to each other. In step 320, the system administrator can execute the configuration tool (CT) 230, which can be a software module that will read the configuration file (CF) 220 in step 330, can check, and compare the software versions specified in the configuration file (CF) 220 against those that are already installed in the device in step 340. In step 350, if the software version in the device does not match those specified in the configuration file (CF) 220, in step 360, the configuration tool (CT) 230 will install the correct version of software into the device 110, 112, 114 based on what is specified on the configuration file (CF) 220. If the software on the device does match those specified in the configuration file (CF) 220, the process continues to step 370, where if the process has reached the end of the configuration file (CF) 220, the process ends in step 380. If not, the process returns to step 330, where the configuration tool (CT) 230 reads the configuration file (CF) 220 to check the software on the next device 110, 112, 114.

In accordance with an exemplary embodiment, using the configuration tool (CT) 230, a software version comparison between devices can be performed to check if there are any differences between two devices, which are the same, for example, a printer. In accordance with an exemplary embodiment, this software version comparison can be run in a diagnostic mode to check if the reason for differences in printed results (in the case of a printing device) is caused by the differences in software versions.

In accordance with an exemplary embodiment, the configuration file (CF) 220 may also be edited by a non-system administrator. For example, in this situation, the configuration manager (CM) 210 can be configured to block any fields that are not editable by a non-system administrator. If a version specified in the configuration file (CF) 220 is different from version installed on device 110, 112, 114, the correct version can be installed.

Figure 3:
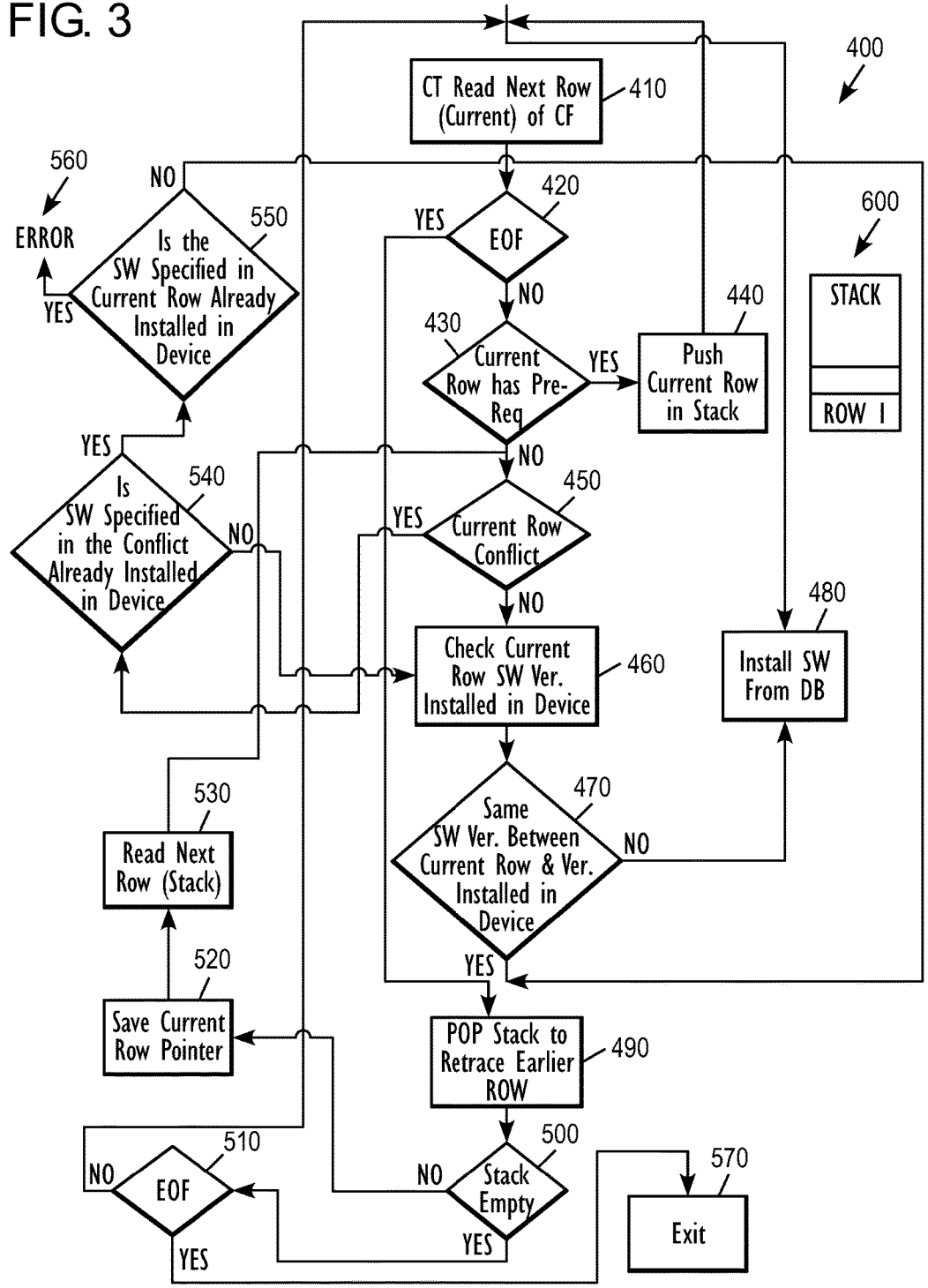
FIG. 3 is a flow chart illustrating an algorithm or logic flow for managing software version compatibility in accordance with an exemplary embodiment.

FIG. 3 is a flow chart illustrating a process 400 for managing software version compatibility in accordance with an exemplary embodiment. As shown, in FIG. 3, in step 410, the configuration tool (CT) 230 will read ("CT Read Next Row (Current) of CF"), for example, the first row (of the first device KM0001) into the configuration file (CF) 220 using a stack 600. In step 420, if the end of the file ("EOF") has not been reached, the process continues where, for example, as shown in FIG. 1, the configuration tool (CT) 230 will see that the Device ID KM0001 with a "Booklet Module" uses version 2.3. The configuration tool (CT) 230 can then check and determine in step 430 that the Booklet Module has a pre-requisite ("Current Row has Pre-Req") calling for a Folding Module. In accordance with an exemplary embodiment, if the module has a pre-requisite, the process continues to step 440, where the configuration tool (CT) 230 will find that the pre-requisite for the Booklet Module, which is the Folding Module is found in the next row (row 2), and can place the current row into the stack 600 ("Push Current Row in Stack").

In accordance with an exemplary embodiment, in step 430, the configuration tool (CT) 230 will notice there is no pre-requisite for Folding Module (row 2, KM00001), so the configuration tool (CT) 230 does not have to traverse the tree link to find the end-point. The process can then continue in step 450 to determine if there are any conflicts between the software modules ("Current Row Conflict"), for example, as shown in FIG. 1, in KM0001, the Folding Module has a conflict with the Punch Module. If no conflicts exist between the software module, the process continues to step 460, wherein the configuration tool (CT) 230 will check the version of the Folding Module software installed in Device KM0001 ("Check Current Row SW Vers. Installed in Device"). In step 470, if Device KM0001 already has Folding Module Version 4.6 installed, the configuration tool (CT) 230 does not need to do anything ("Same SW Ver. Between Current Row & Ver. Installed in Device"). However, if the version is different, in step 480, the configuration tool (CT) 230 will install Folding Module Version 4.6 into Device KM0001. In accordance with an exemplary embodiment, in step 480, the configuration tool (CT) 230 can install the current module by retrieving the current module from a customize software repository DB 240, which has copy of the software for Folding Module version 4.6 (Install SW from DB"). In accordance with an exemplary embodiment, for example, if the version already installed in Device KM0001 is later than that specified by the configuration file (CF) 220, then a warning message can be displayed on the configuration manager (CM) 210.

In accordance with an exemplary embodiment, next, the configuration tool (CT) 230 can perform the same steps to determine if the configuration module needs to install the Booklet Module in Device KM0001. The configuration tool (CT) 230 can perform this by checking the version of the Booklet Module installed in the Device KM0001. If it is the same, it does nothing, if different, then retrieve booklet module version 2.3 from the common software repository DB 242.

In accordance with an exemplary embodiment, the configuration tool (CT) 230 will check the next line (row 3), the punch module of Device KM0001. In accordance with an exemplary embodiment, the configuration tool would recognize or determine that there is a conflict with the Folding Module. The configuration tool (CT) 230 can then check if Device KM0001 already installed the folding module installed. If YES, then the configuration tool (CT) 230 will not do anything. If the folding module is not installed, then the configuration tool (CT) 230 will install the punch module by going to the customize software repository DB 240.

In addition, as shown in FIG. 3, the process can include in step 490, the configuration tool 230 can be configured to repeat steps 410-480 by retracing earlier steps to confirm the correct version of the current software module has been install. For example, in step 490, a "Push and Pop (POP) Stack to Retrace Earlier ROW" can be performed. In step 500, if the stack is empty, the process continues to step 510, end of file (EOF). If the stack is not empty, the process can continue to step 520, where the current row pointer is saved ("Save Current Row Pointer"). In step 530, the process reads the next row ("Read Next Row (Stack)"), and continues to step 450, where a determination is made, if the current row has any conflicts with other rows. In step 510, alternatively, if the end of the file has been reached, the process continues to step 570, wherein the process terminates ("EXIT").

In accordance with an exemplary embodiment, the method and system as disclosed can also checking differences in software versions installed in system. For example, if a user has a problem printing on one device but no problem printing on the same model but different device, the configuration manager (CM) 210 will execute configuration tool (CT) 230 and display if there is any software version discrepancy between the two devices. In accordance with an exemplary embodiment, if there is a discrepancy, configuration tool (CT) 230 will also display the possible differences by checking on "Reason for Fix" in the configuration file (CF).

As shown in FIG. 3, in step 540, the configuration tool 230 can check to see if the software module specified, for example, in the conflict has already be installed ("Is the SW Specified in the Conflict Already Installed in Device"). If YES, the process continues in step 550 to check to see if the software specified in the current row is already installed in the device (Is SW Specified in Current Row Already Installed in Device"), and if the answer is YES, an ERROR message 560 can be provided on the user interface of the configuration manager 210.

In accordance with another exemplary embodiment, a non-transitory computer readable recording medium stored with a computer readable program code for managing software version compatibility amongst a plurality of devices within a network, the computer readable program code configured to execute a process comprising: hosting a configuration file on a server, the configuration file including an identifier for one or more devices within the network; populating the configuration file for each of the one or more devices within the network with a device identifier and one or more software modules associated with each of the one or more devices within the network, the at least one software module configured to perform one or more specific operations on a device; executing a configuration tool on the server to compare the one or more software modules in each of the one or more devices within the network to check for conflicts between two or more software modules on the one or more devices; and replacing at least one of the two or more software modules on the one or more devices, if a conflict exists between the two or more software modules.

The computer readable recording medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for managing software version compatibility amongst a plurality of devices within a network, the method comprising:
hosting a configuration file on a server, the configuration file including an identifier for two or more printers within the network;
populating the configuration file for each of the two or more printers within the network with a printer identifier and one or more software versions associated with each of the two or more printers within the network;
executing a configuration tool on the server to compare the one or more software versions on a first printer of the two or more printers and the one or more software versions on at least one second printer of the two or more printers; and
displaying if there is a software version discrepancy between the one or more software versions on the first printer of the two or more printers and the one or more software versions on the at least one second printer of the two or more printers.

2. The method of claim 1, wherein each of the two or more printers are compatible to each other such that a print job can be printed on any of the two more printers.

3. The method of claim 1, comprising:
comparing the one or more software versions on the first printer of the two or more printers and the one or more software versions on the at least one second printer of the two or more printers when a print job cannot be printed on the first printer or the at least one second printer.

4. The method of claim 1, comprising:
displaying a difference between the one or more software versions on the first printer of the two or more printers and the one or more software versions on the at least one second printer of the two or more printers when the software version discrepancy is identified.

5. The method of claim 1, comprising:
displaying an error message on a user interface when there is the software version discrepancy between the one or more software versions on the first printer of the two or more printers and the one or more software versions on the at least one second printer of the two or more printers.

6. The method of claim 1, comprising:
replacing at least one of the one or more software versions on the first printer of the two or more printers and the one or more software versions on the at least one second printer of the two or more printers with a different software version when the software version discrepancy is identified.

7. The method of claim 1, wherein the one or more software versions associated with each of the two or more printers within the network are configured to execute at least one post-processing function on a printer.

8. The method of claim 7, wherein the at least one post-processing function on the two or more printers include one or more of the following:
a booklet module, a folding module, a punch module, a stitching or stapling module, and a stacking module.

9. The method of claim 1, comprising:
creating and editing the configuration file with a configuration manager having a user interface.

10. The method of claim 1, comprising:
performing the comparison of the one or more software versions on the first printer of the two or more printers and the at least one second printer of the two or more printers on software versions configured to perform a same specific operation; and
replacing one or more of the one or more software versions when the same specific operation does not produce a same result on at least one of the first printer of the two or more printer and the second printer of the two or more printers.

11. A non-transitory computer readable recording medium stored with a computer readable program code for managing software version compatibility amongst a plurality of printers within a network, the computer readable program code configured to execute a process comprising:
hosting a configuration file on a server, the configuration file including an identifier for two or more printers within the network;
populating the configuration file for each of the two or more printers within the network with a printer identifier and one or more software versions associated with each of the two or more printers within the network;
executing a configuration tool on the server to compare the one or more software versions on a first printer of the two or more printers and the one or more software versions on at least one second printer of the two or more printers; and
displaying if there is a software version discrepancy between the one or more software versions on the first printer of the two or more printers and the one or more software versions on the at least one second printer of the two or more printers.

12. The readable recording medium of claim 11, wherein each of the two or more printers are compatible to each other such that a print job can be printed on any of the two more printers.

13. The readable recording medium of claim 11, comprising:
comparing the one or more software versions on the first printer of the two or more printers and the one or more software versions on the at least one second printer of the two or more printers when a print job cannot be printed on the first printer or the at least one second printer.

14. The readable recording medium of claim 11, comprising:
displaying a difference between the one or more software versions on the first printer of the two or more printers and the one or more software versions on the at least one second printer of the two or more printers when the software version discrepancy is identified.

15. The readable recording medium of claim 11, comprising:
displaying an error message on a user interface when there is the software version discrepancy between the one or more software versions on the first printer of the two or more printers and the one or more software versions on the at least one second printer of the two or more printers.

16. The readable recording medium of claim 11, comprising:

replacing at least one of the one or more software versions on the first printer of the two or more printers and the one or more software versions on the at least one second printer of the two or more printers with a different software version when the one or more software versions when the software version discrepancy is identified.

17. A server for managing software version compatibility amongst two or more printers within a network, comprising:
a configuration file, the configuration file including an identifier for each of the two or more printers within the network;
a configuration manager configured to populate the configuration file for each of the two or more printers within the network with a printer identifier and one or more software versions associated with each of the two or more printers within the network;
a configuration tool configured to compare the one or more software versions on a first printer of the two or more printers and the one or more software versions on at least one second printer of the two or more printers; and
a display configured to display if there is a software version discrepancy between the one or more software versions on the first printer of the two or more printers and the one or more software versions on the at least one second printer of the two or more printers.

18. The server of claim 17, wherein each of the two or more printers are compatible to each other such that a print job can be printed on any of the two more printers.

19. The server of claim 17, wherein the configuration tool is configured to:
compare the one or more software versions on the first printer of the two or more printers and the one or more software versions on the at least one second printer of the two or more printers when a print job cannot be printed on the first printer or the at least one second printer.

20. The server of claim 17, wherein the display is configured to:
display a difference between the one or more software versions on the first printer of the two or more printers and the one or more software versions on the at least one second printer of the two or more printers when the software version discrepancy is identified.

* * * * *